(12) United States Patent
Pullinger et al.

(10) Patent No.: US 11,555,306 B2
(45) Date of Patent: Jan. 17, 2023

(54) FIRE-STOPPING PRODUCT

(71) Applicant: TREMCO CPG UK LIMITED, Wigan Greater Manchester (GB)

(72) Inventors: Gary Pullinger, Crayford (GB); Andrew Taylor, Elswick Preston (GB); Simon Jones, Solihull (GB)

(73) Assignee: TREMCO CPG UK LIMITED, Wigan Greater Manchester (GB)

( * ) Notice: Subject to any disclaimer, the term of this patent is extended or adjusted under 35 U.S.C. 154(b) by 7 days.

(21) Appl. No.: 17/280,651

(22) PCT Filed: Sep. 28, 2018

(86) PCT No.: PCT/GB2018/052774
§ 371 (c)(1),
(2) Date: Mar. 26, 2021

(87) PCT Pub. No.: WO2020/065243
PCT Pub. Date: Apr. 2, 2020

(65) Prior Publication Data
US 2022/0042301 A1    Feb. 10, 2022

(51) Int. Cl.
*E04B 1/94* (2006.01)
*A62C 2/06* (2006.01)
*C09K 21/02* (2006.01)
*C09K 21/04* (2006.01)
*E04F 13/00* (2006.01)
(Continued)

(52) U.S. Cl.
CPC .............. *E04B 1/942* (2013.01); *A62C 2/065* (2013.01); *C09K 21/02* (2013.01); *C09K 21/04* (2013.01); *E04B 1/947* (2013.01); *E04F 13/007* (2013.01); *E04F 13/0803* (2013.01);
(Continued)

(58) Field of Classification Search
CPC ...................................................... A62C 2/065
See application file for complete search history.

(56) References Cited

U.S. PATENT DOCUMENTS

| 5,443,894 A | 8/1995 | Pollock et al. |
| 2015/0059260 A1 | 3/2015 | Kallweit et al. |

FOREIGN PATENT DOCUMENTS

| JP | H02-18300 A | 1/1990 |
| JP | H08-60764 A | 3/1996 |

(Continued)

OTHER PUBLICATIONS

International Search Report issued in PCT/GB2018/052774 (PCT/ISA/210), dated Jun. 24, 2019.
(Continued)

*Primary Examiner* — Peter F Godenschwager
(74) *Attorney, Agent, or Firm* — Birch, Stewart, Kolasch & Birch, LLP

(57) ABSTRACT

The invention provides a fire-stopping product, an insulated building façade comprising a fire-stopping product, and a method of making a fire-stopping product. The fire-stopping product comprises a resilient, porous material at least partially impregnated with an intumescent agent and held in compression by a releasable restraint. When exposed to hot gases from a fire, the restraint yields to release the resilient, porous material in an initial expansion, thereby exposing the intumescent agent to the hot gases and allowing rapid intumescence to occur. When implemented in a ventilated building façade, the fire-stopping product is able to close an air gap in a short amount of time.

30 Claims, 4 Drawing Sheets

(51) Int. Cl.
*E04F 13/08* (2006.01)
*C09K 3/10* (2006.01)
(52) U.S. Cl.
CPC .. *E04F 13/0875* (2013.01); *C09K 2003/1037* (2013.01); *C09K 2003/1053* (2013.01); *E04F 2290/045* (2013.01)

(56) References Cited

FOREIGN PATENT DOCUMENTS

| JP | 2000-038785 A | 2/2000 |
| JP | 2009-138147 A | 6/2009 |
| JP | 2015-021303 A | 2/2015 |
| JP | 2017-210378 A | 11/2017 |
| WO | WO 2017194558 A2 | 11/2017 |

OTHER PUBLICATIONS

Written Opinion of the International Searching Authority issued in PCT/GB2018/052774 (PCT/ISA/237), dated Jun. 24, 2019.

FIRE-STOPPING PRODUCT

FIELD OF THE INVENTION

The invention relates to fire-stopping products, in particular fire-stopping products suitable for preventing the spread of fire within a ventilated façade, curtain wall or external insulation system.

BACKGROUND

Fire stopping is concerned with maintaining separate compartments in a structure in case of fire. The compartments should be sealed off from each other with respect to smoke, heat and flames to give more time for the people in the areas not affected by fire to escape the building before the fire spreads.

Fire stopping products are provided to seal gaps between compartments, both gaps between building elements (floors, walls, roofs) and gaps within building elements such as penetrations for pipes or cables, and the spaces between doors and their frames.

Generally, there are two kinds of technologies known in the art. Passive technologies such as sealants, mastics and fire batts are permanently resistant to fire and are designed to resist fire conditions without change. Reactive technologies such as intumescent tapes or pipe collars are designed to expand when heated in the same manner as intumescent coatings, and fill gaps which would normally be open in the non-fire situation. The present invention is concerned with reactive fire-stopping technologies.

Many modern building façades are ventilated designs: the thermal insulation is bonded to the outside of the building's wall, then there is an air gap, then there is a weatherproof cladding. The air gap provides circulation of air and prevents the insulation from becoming waterlogged and ineffective.

In a fire situation, the air gap can act as a chimney, heat and flames travelling up the gap much faster than on the outside of the building and allowing the fire to easily jump between floors. To prevent this, an intumescent tape may be installed which will expand and fill the gap in the event of a fire.

Existing products include, for example, an EPDM (ethylene propylene diene M-class rubber) tape compounded with intumescent graphite. However this is a high-density material with poor thermal conductivity, and takes too long, approximately 6 minutes, to close the cavity in a fire. ASFP Technical Guidance Document TGD19 requires the cavity to be closed in a maximum time of 5 minutes in the event of a fire.

Therefore a need exists to provide a fire-stopping product that has a shorter activation time in the event of a fire to close a ventilation cavity and stop the spread of fire across a building.

SUMMARY

Accordingly, the invention provides a fire-stopping product comprising a resilient, porous material at least partially impregnated with an intumescent agent, wherein the resilient, porous material is held in compression by a releasable restraint, wherein the restraint yields on exposure to heat and/or flames.

By "resilient" it is meant that the porous material is elastic and, on removal of the restraint, expands of its own volition. In other words, the resilient, porous material may be compressed, held under compression and will recover its original shape when the compression is released.

By "fire-stopping", it is meant that the product prevents the spread of fire for at least a period of time, although eventually it may fail. Fire-stopping products are generally designed to stop the spread of fire for a period of time long enough to allow building occupants to escape to safety.

The resilient, porous material supports the intumescent agent when the fire-stopping product lies dormant in non-fire conditions. In addition, the resilient, porous material serves an important function in the fire-stopping action of the invention. In the event of a fire the restraint will yield, thus allowing the resilient, porous material to expand independently of the expansion of the intumescent agent. This initial expansion of the resilient, porous material that carries the intumescent agent enables the intumescent agent to be very quickly exposed to the hot gases that result from a fire. The result of the initial expansion is that intumescence occurs early on in the event of a fire and the fire-stopping product is faster acting than previous fire-stopping products.

By "yield", it is meant that the force of the restraint keeping the resilient, porous material in compression is exceeded by the outward pressure of the resilient, porous material exerted on the restraint due to the compression strain under which the resilient, porous material is held.

The restraint may yield by a variety of mechanisms, depending on the nature of the restraint. In some embodiments, the restraint may melt away either partially or entirely. In other embodiments, the restraint may burn away either partially or entirely. In yet further embodiments, the restraint may soften and thus elongate or otherwise deform due to the force exerted by the resilient, porous material as it expands. In yet still further embodiments, the restraint may undergo a physical change such as a glass transition, thus becoming elastic and thereby no longer capable of holding the resilient, porous material under compression.

In the case of melting or burning, the restraint need not entirely disappear. For example, in the form of a thread, tape, ribbon, etc., a break in one location may be sufficient to release the resilient, porous material from compression. Release by burning may be particularly suitable for a restraint in the form of a thin thread, such as a cotton or silk thread. A thread restraint may be wound around the resilient, porous material in a coil, woven, in a net configuration or any other suitable arrangement.

In the case of softening, a restraint such as a polymer may still be solid, yet reach a temperature at which it may undergo plastic deformation as a result of the force exerted by the resilient, porous material held under compression. In this case, the tensile strength of the restraint decreases as temperature increases. In other words, the force required to deform the restraint when it reaches a critical temperature is less than the force exerted by the resilient, porous material and so the restraint yields.

In the case of a glass transition temperature, preferably the transition from glassy to rubbery is a well-defined, sharp transition. The restraining force of the elastic restraint at temperatures above its glass transition temperature is preferably lower than the force exerted on the restraint by the resilient, porous material such that the resilient, porous material is released from compression and able to expand.

A combination of yielding mechanisms is possible, depending on the material chosen.

The relationship between the intumescence temperature, the yielding temperature and the resilience of the resilient, porous material enables the fire-stopping material of the invention to activate quickly in the event of a fire. The temperature at which a particular intumescent agent will intumesce is material-dependent. Starting from this threshold, the maximum temperature at which the restraint yields can be selected. The yielding temperature should preferably be lower than the intumescence temperature of the intumescent agent, whilst being above the normal service temperature of the fire-stopping product. The strength of the restraint can be selected knowing the resilience of the resilient, porous material.

Overall, under normal, non-fire conditions the restraint should maintain its integrity such that the resilient, porous material is held under compression, whereas in the event of a fire the restraint should yield, then the resilient, porous material should expand, then the intumescent agent should intumesce.

Preferably, the resilient, porous material has a porosity of 10-100 pores per lineal inch (ppi), preferably 20-80 ppi.

The resilient, porous material may comprise an open-cell foam or a non-woven material, preferably an open-cell foam.

Where the resilient, porous material is an open-cell foam, preferably is has a porosity of 10-100 pores per lineal inch (ppi), preferably 20-80 ppi.

Suitable open-cell foams include polymeric foams such as polyurethane, polyvinyl chloride foams, polyolefin foams, polystyrene foams, foams based on copolymers of acrylonitrile, styrene and potentially butadiene and also foams made of thermosetting synthetic resins such as for example: melamine formaldehyde resins or phenol formaldehyde resins. Preferably the resilient, porous material comprises a polyurethane (PU) open-cell foam (i.e. a reticulated PU foam). PU foams possess suitable mechanical properties for this invention.

As an alternative to an open-cell foam, the resilient, porous material may comprise a non-woven material comprising at least one of polymeric fibres, metallic fibres and inorganic fibres. A suitable non-woven material may comprise polypropylene fibres. Inorganic fibres are preferred for their fire-resistance properties.

The resilient, porous material may further be at least partially impregnated with a binder. The binder may improve adhesion between the resilient, porous material and the intumescent agent. The binder may comprise one or more of an acrylic binder, polyvinyl acetate, polyvinyl acrylate, polyvinyl chloride mixed polymerisates, polychloroprenes and carbonisers, such as for example phenolic resins, melamine resins, polyimides or polyacrylonitrile.

Preferably the binder comprises an acrylic binder. Acrylic binders are preferred because they exhibit good adhesion, water resistance and resistance to degradation.

Following expansion of the resilient, porous material, the intumescent agent is exposed to hot gases and intumesces to form a barrier to the further spread of hot gases and/or flames. Once swollen, the intumescent agent may be self-supporting.

The intumescent agent may preferably include at least one of: graphite, polyphosphate, melamine, pentaerythritol, titanium dioxide and exfoliated vermiculite.

Preferably the intumescent agent comprises graphite.

Preferably the intumescent agent comprises a phosphate, preferably a polyphosphate and particularly preferably ammonium polyphosphate as a phosphorus-containing compound. In this case can the ammonium polyphosphate can have a pH value between 5 and 8 and preferably between 5.5 and 7.5. Advantageously the viscosity of the ammonium polyphosphate at a temperature of 25° C. and a 10% suspension is less than 200 mPas, preferably less than 150 mPas and particularly preferably less than 100 mPas. Generally other flame-proofing agents, for example based on halogen, boron or nitrogen compounds, would also be considered in order to achieve a difficult combustibility or non-combustibility.

However, the use of phosphorus compounds has also proved particularly advantageous in conjunction with the use of expandable graphite, both in processing and also in use. An ammonium polyphosphate suspension between 5% and 20%, preferably between 7% and 18%, preferably between 8% and 12%, has proved particularly suitable (these details relate in each case to percentages by weight). Such an ammonium polyphosphate suspension preferably forms a slurry in water, wherein the specifically light powder is kept suspended very well in water. However, only a proportion of less than 10%, preferably of less than 5%, preferably of less than 3%, preferably of less than 2%, preferably of less than 1% and preferably of less than 0.5% is dissolved.

Preferably already a sufficient fireproofing or sufficient flame inhibition can be achieved—in particular by synergistic effects of a phosphorus-containing compound with the expandable graphite—so that layered silicates as additional fire or flame retardants can be omitted. In a further preferred embodiment it is possible to completely omit further fire or flame retardants.

Advantageously, as mentioned above, a phosphate, particularly preferably a polyphosphate, particularly preferably an ammonium polyphosphate is used as a phosphorus-containing compound. This ammonium polyphosphate advantageously has a phosphorus content (in % (w/w)) between 25 and 36, preferably between 28 and 35 and particularly preferably between 31 and 33. The proportion of nitrogen (likewise in % (w/w)) is preferably between 10 and 20, preferably between 12 and 18 and particularly preferably between 14 and 15.

The proportion of water in the substance (likewise in % (w/w)) is preferably below 1, particularly preferably below 0.5 and particularly preferably below 0.4 and particularly preferably below 0.3. The solubility in water (based on a 10% solution) is preferably (in % (w/w)) below 1.0, preferably below 0.8, preferably below 0.7 and preferably below 0.6 and particularly preferably below 0.55. These percentage details relate in each case to percentages by weight.

The average particle size of the ammonium polyphosphate (in µm) is between 5 and 25, preferably between 10 and 20 and particularly preferably between 15 and 18.

A particle size of the expandable graphite (measured in Mesh) is preferably greater than 20 Mesh, preferably greater than 30 Mesh, particularly preferably greater than 40 Mesh and particularly preferably greater than 50 Mesh. (This information describes the particle size of material sieved through sieves with corresponding mesh sizes). The above-mentioned details of the mesh size in Mesh in each case represent the mesh size at which at least 80% of the particles remain in the sieve. The standard ASTM E11 is taken into consideration. Preferably between 8% and 12% have a size of more than 500µ, and/or between 80% and 90% have a size of more than 200µ (and less than 500µ), and/or between 1% and 4% have a size of more than 100µ (and less than 200µ).

Preferred intumescent agents are graphite and a mixture of graphite and ammonium polyphosphate because of their rapid intumescence at relatively low temperature.

Preferably the weight ratio of the resilient, porous material to the intumescent agent, including any binder, is from 1:1 to 1:8 by dry weight, most preferably from 1:2 to 1:6. Preferably the weight ratio of the resilient, porous material to the intumescent agent, excluding any binder, is from 1:0.2 to 1:6, most preferable from 1:1 to 1:3

To prevent the resilient, porous material from unnecessarily expanding during non-fire conditions, the resilient, porous material is held in compression by a restraint. The restraint is configured to melt, soften, or burn to a point where it will break when exposed to the hot gases generated during a fire.

The restraint may be in the form of a mechanical device external to the resilient, porous material, such as a tape, thread, film, extruded tube, net, or shrink-wrapped tubing external to the resilient, porous material The restraint may be made of a polymer capable of melting, softening, burning, undergoing a glass transition or another physical and/or chemical change when exposed to hot gases from a fire whilst maintaining its integrity as a solid during normal non-fire conditions.

Preferably the restraint comprises one or more polymers selected from polyethylene (including different forms of polyethylene such as low-density polyethylene), polymethylmethacrylate, polystyrene, polyvinylchloride, polypropylene and acrylonitrile butadiene styrene. The restraint may be designed to yield at a temperature below the intumescence temperature of the intumescence agent and above normal service temperature during non-fire conditions.

Preferably the restraint comprises low-density polyethylene (LDPE). LDPE has been found during testing to exhibit melting—and thereby release of the resilient, porous material—during fire conditions whilst maintaining integrity in non-fire conditions.

The restraint may be made of a textile thread that can burn rapidly on contact with flames or melt on contact with hot gases, thereby quickly releasing the resilient, porous material from compression. Suitable threads may comprise natural fibres such as cotton, silk, linen, hemp, bamboo, wool, cellulosic fibres and others, and may also or alternatively comprise synthetic fibres such as polymers, for example polyester fibres, polyamide fibres, polyethylene fibres, and others.

The thickness of the restraint is selected with regard to the mechanical properties, in particular the resilience, of the resilient, porous material and the tensile strength and/or other properties such as combustibility of the restraint itself under both fire and non-fire conditions. In this way, the skilled person can select an appropriate thickness for the restraint based on the particular conditions of use such that the restraint maintains integrity unless there is a fire.

Such a restraint may be considered to at least partially encapsulate the resilient, porous material in a manner such that the restraint is external to the resilient, porous material.

In an alternative configuration, the restraint may be in the form of a meltable solid, such as a wax, impregnated into the resilient, porous material. In this case, the restraint is absorbed into the resilient, porous material whilst in its expanded state by immersing it in the restraint in its liquid form. The resilient, porous material is then compressed and expanded, allowing it to draw in liquid.

The resilient, porous material is then compressed again, thereby squeezing out excess liquid. Finally, the resilient, porous material is held in compression until the liquid restraint has solidified. When solidified, the restraint alone may hold the resilient, porous material in compression.

The meltable solid is selected to suit the conditions of use and must melt in fire conditions whilst remaining solid during non-fire conditions. Waxes may include hydrocarbons of chain length above $C_{20}$, for example, a chain length in the range of $C_{25-100}$, preferably $C_{30-70}$, and lipids of natural or synthetic origin. When the solid is melted, or softened to a sufficient degree, the resilient, porous material is able to quickly expand the same as when a restraint external to the resilient, porous material is utilised.

Preferred waxes include plants and animal waxes, such as bee wax, Chinese wax, shellac wax, lanolin, carnauba wax and ouricouri wax. Preferred waxes also include petroleum and hydrocarbon derived waxes, such as paraffin and polyalkylene derived waxes.

Regardless of whether the restraint is an impregnated meltable material or an external restraint, the temperature at which the restraint fails to hold the resilient, porous material in compression, whether by softening, melting, burning or otherwise, is selected so as the restraint will only yield in the conditions of a fire. "Ambient" temperature may be significantly higher than 25° C. dependent on, for example, the geographical location of the building and the location of the fire-stopping product within the building, for example near to a hot pipe or on a face of the building that receives little sunlight.

Preferably, the temperature at which the restraint yields and therefore releases the resilient, porous material is no higher than 225° C., preferably from 80° C. to 130° C., preferably from 100° C. to 120° C. The yielding temperature of the restraint should be selected to be lower than the temperature at which the intumescent agent activates. This relationship allows the resilient, porous material to expand before the intumescent agent begins to intumesce and exposes the intumescent agent to hot gases rapidly in the event of a fire.

A maximum threshold of 225° C., preferably 130° C. or even 120° C., for the yielding temperature of the restraint is suitable where graphite is used as the intumescent agent, or as a component of the intumescent agent. The minimum threshold of 80° C., preferably 90° C. or even 100° C., for the yielding temperature of the restraint allows for localised hot spots under non-fire conditions, for example if a warm pipe passes near to the fire-stopping product or if the fire-stopping product is in direct sunlight.

Graphite, a suitable intumescent agent for use in the present invention, typically intumesces at above 100° C. and so the resilient, porous material must expand before the intumescence temperature is reached. Some graphite systems may intumesce at a temperature as high as 235° C. The composition of the intumescent agent is preferably selected in such a way that its expansion begins at a specific temperature, wherein this temperature is preferably in the range from 140° C. to 270° C., such as from 150° C. to 250° C., such as from 160° C. to 240° C., such as from 170° C. to 235° C.

The complete fire-stopping product may have any suitable dimensions. For example, the fire-stopping product may be in the form of a tape, plate or pre-cut strips.

Preferably, the fire-stopping product under non-fire conditions has a thickness of less than 50 mm, preferably less than 25 mm, preferably less than 20 mm.

Preferably a resilience of the resilient, porous material is such that, when given a predefined compression, especially a compression to 50% of the original thickness, it resets at least partially, preferably to at least 60% of the original thickness, preferably to at least 70% of the original thickness, preferably to at least 75% of the original thickness and very preferably to at least 80% of the original thickness. These data refer especially to the not yet impregnated material.

Optionally, at least a part of at least one face of the fire-stopping material is coated with a pre-formed attachment means, such as an adhesive, mechanical fastening means or holes for mechanical fastenings, to facilitate attachment to a surface within a ventilation cavity. Alternatively, the fire-stopping material may not be provided with a pre-formed attachment means and is attached to a cavity wall by conventional attachment means, such as nails.

The invention also provides an insulated building façade comprising an external wall and a cladding layer substantially parallel to the external wall, wherein the external wall and the cladding layer are spaced apart from one another to define an air gap there between, wherein a fire-stopping product is disposed within the air gap and is attached to a part of a face of the cladding layer or a face of the external wall and is expandable to fill the distance between the cladding and the thermal insulation when contacted with the heat of a fire, wherein the fire-stopping product comprises a resilient, porous material at least partially impregnated with an intumescent agent, wherein the resilient, porous material is held in compression by a releasable restraint, wherein the restraint is released by melting, softening or burning on exposure to hot gases and/or flames from a fire.

The air gap forms a ventilation cavity that acts to prevent dampness or mould associating with the thermal insulation.

Within the ventilation cavity, the fire-stopping product may be in the form of a tape oriented in a substantially horizontal position relative to the façade. This orientation allows the fire-stopping product to block the spread of a fire between stories of a building.

Alternatively or in addition, the fire-stopping product may be oriented in a substantially vertical position to block the spread of a fire laterally across a building façade.

Preferably, the face of the external wall adjacent to the air gap is provided with a layer of thermal insulation, such that the air gap is defined by the layer of thermal insulation and the cladding layer. The fire-stopping product may therefore be attached to a thermal insulation layer directly, or to a joist between insulation slabs.

The cladding layer may comprise at least one of a brick wall, metal sheeting, polymeric sheeting, a cement board, or weatherboarding. Preferably, the cladding layer is weather-proof.

The invention further provides a method of manufacturing a fire-stopping material comprising the steps:
  a. providing a resilient, porous material;
  b. providing a solution of an intumescent agent;
  c. impregnating the resilient, porous material with the solution;
  d. drying the solution, thereby removing liquid;
  e. compressing the resilient, porous material;
  f. constraining the resilient, porous material in its compressed state with a restraint.

The step of impregnating the resilient, porous material with the solution of intumescent agent may be carried out by compressing the resilient, porous material, contacting the compressed resilient, porous material with the solution, then allowing the resilient, porous material to expand, thereby drawing the solution into the pores.

The resilient, porous material may be fully or partially impregnated with the intumescent agent.

If a binder is used, it may be impregnated into the resilient, porous material in the same step as the intumescent agent. The solution provided in step b may comprise both an intumescent agent and a binder or binder precursor.

An embodiment of the invention will now be described in detail with reference to the drawings.

DETAILED DESCRIPTION

Figure 1:
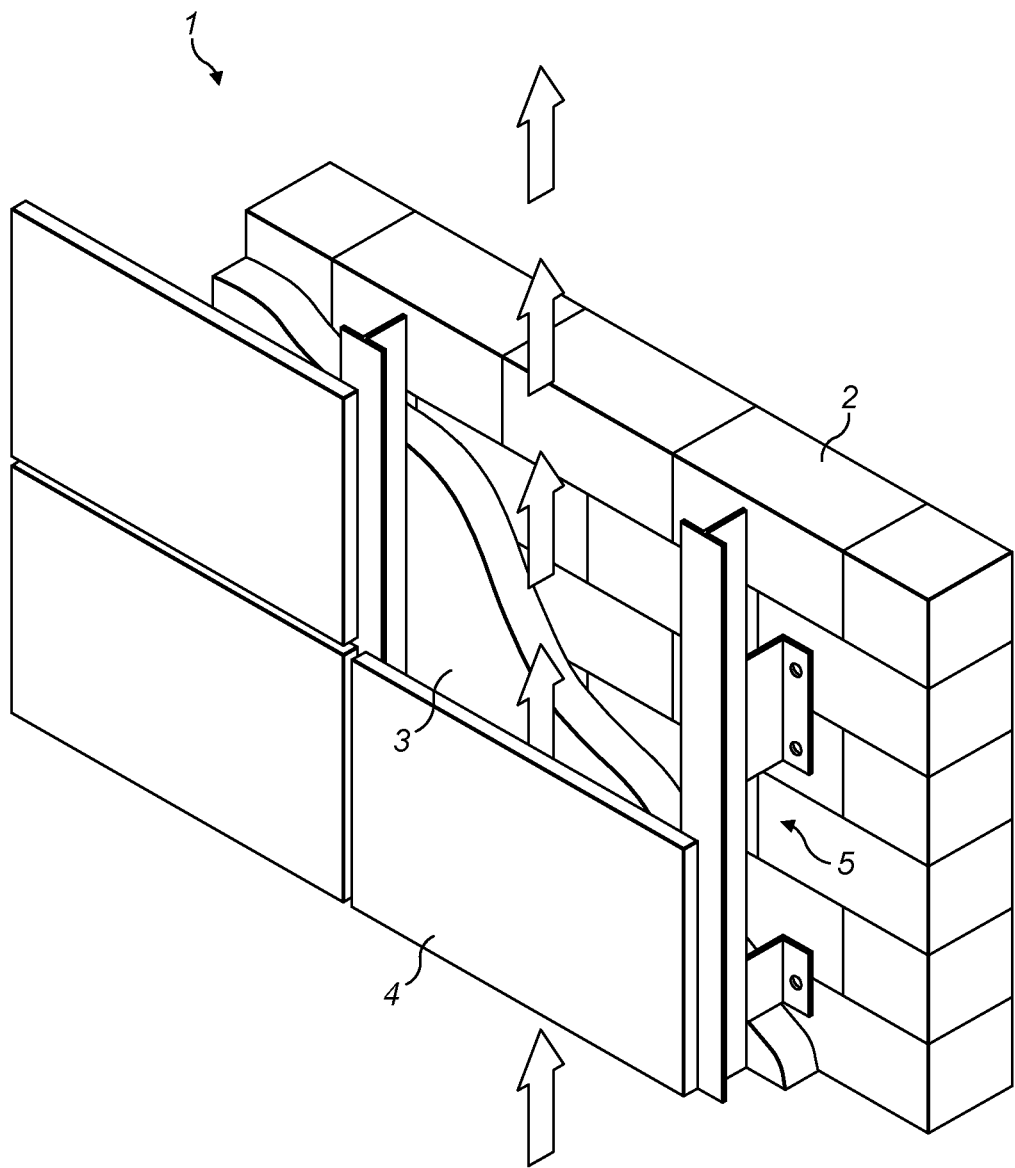
FIG. 1 shows a typical ventilated façade design.

As described above, a typical ventilated building façade 1 as shown in FIG. 1 comprises a building wall 2, thermal insulation 3 applied to the building wall 2, a weather-proof cladding 4 and an air gap acting as a ventilation cavity 5 defined by the space between the weather-proof cladding 4 and the thermal insulation 3.

A ventilation cavity 5 as shown in FIG. 1 allows external thermal insulation to be both weather-proof and aerated, thus preventing mould and damp accumulating. Air can circulate within the ventilation cavity 5 across the ventilated building façade 1 as illustrated by the arrows in FIG. 1. A ventilation cavity 5 has the drawback that it can act as a chimney in the event of a fire, accelerating the spread of fire across a building.

Figure 2:
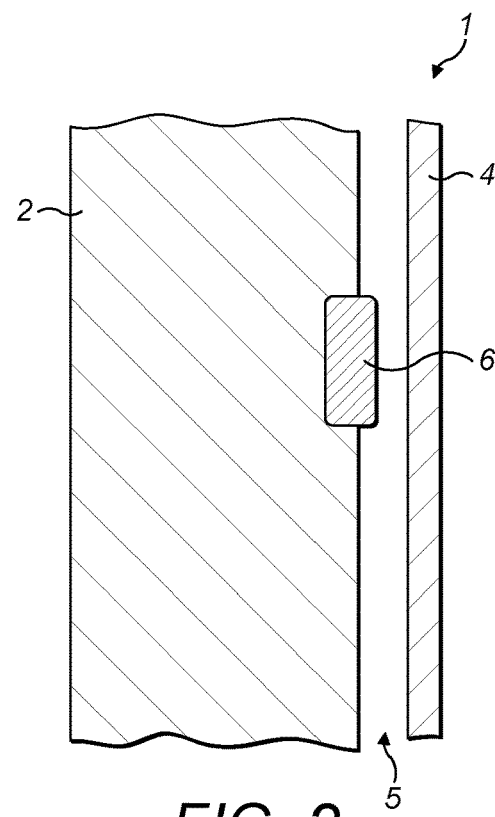
FIG. 2 shows a typical installation of an active fire-stopping material in a ventilated façade.

To overcome this drawback, it is known to provide an intumescent fire barrier (fire-stopping product) 6 in the ventilation cavity 5, disposed on either a surface of the thermal insulation 3 facing out towards the ventilation cavity 5 or a surface of the weather-proof cladding 4 facing in towards the ventilation cavity 5, as illustrated in FIG. 2. The ability to circulate air in normal conditions is retained, since the intumescent fire barrier 6 only expands to fill the air gap 5 between the thermal insulation 3 and the weather-proof cladding 4 when there is a fire.

Maintaining the air gap 5 in non-fire conditions can also prevent the accumulation of debris.

Existing intumescent fire barriers include graphite encapsulated in a polymeric matrix. The polymeric matrix must melt before the graphite is exposed to the hot gases and able to intumesce and close the air gap. Graphite is only exposed once the polymer in which it is encased has melted. Such a mechanism is too slow for many situations and indeed some regulations require a shorter time for the air gap to be closed than is currently possible.

The present invention overcomes this problem as illustrated in FIGS. 4a to 4d.

Figure 4A:
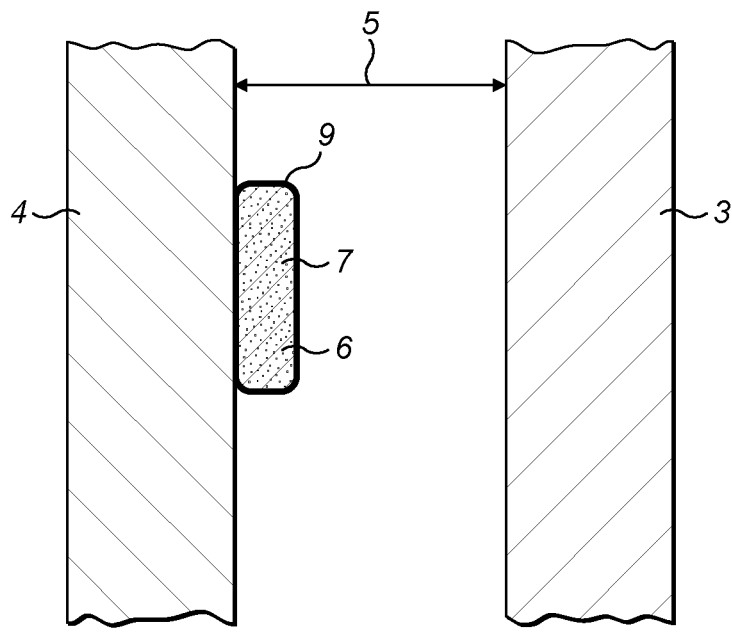
FIGS. 4a to 4d show the working mechanism of the fire-stopping material of the invention in the event of a fire when installed in a typical ventilated façade.

FIG. 4a shows an exemplary fire-stopping product 6 according to the invention disposed within a ventilation cavity 5 defined by a weather-proof cladding 4 and a thermal insulation layer 3 that is attached to a building wall (not shown). The fire-stopping product in this example comprises compressed foam 7 impregnated with intumescent graphite 8 and help in compression by a thin restraint 9. In this Figure, the fire-stopping product is attached to an inner face of the weather-proof cladding 4. However, it would work equally well if applied to an outer face of the thermal insulation 3 or directly to the outer face of the building wall 2 in the absence of a thermal insulation layer.

Figure 4B:
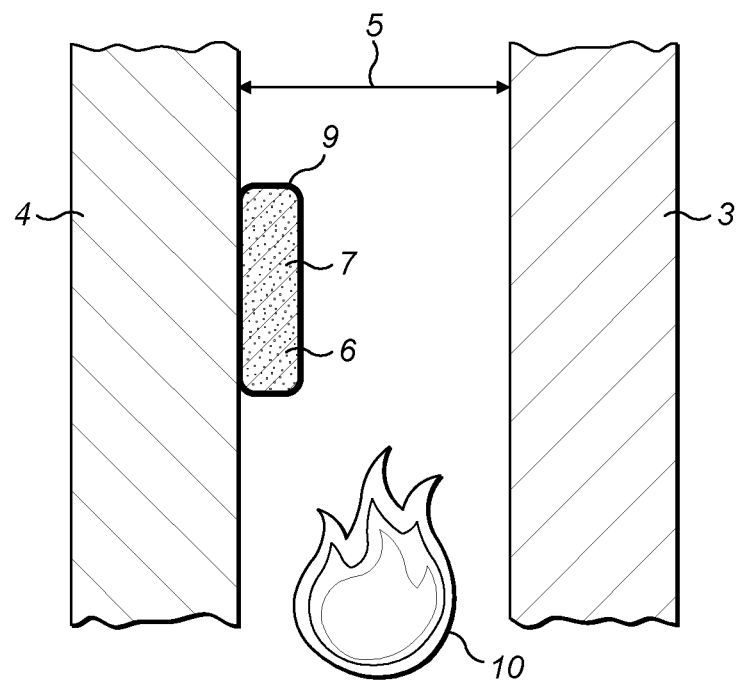

FIG. 4b demonstrates that a fire 10 can easily spread around a building via the ventilation cavity 5.

Figure 4C:
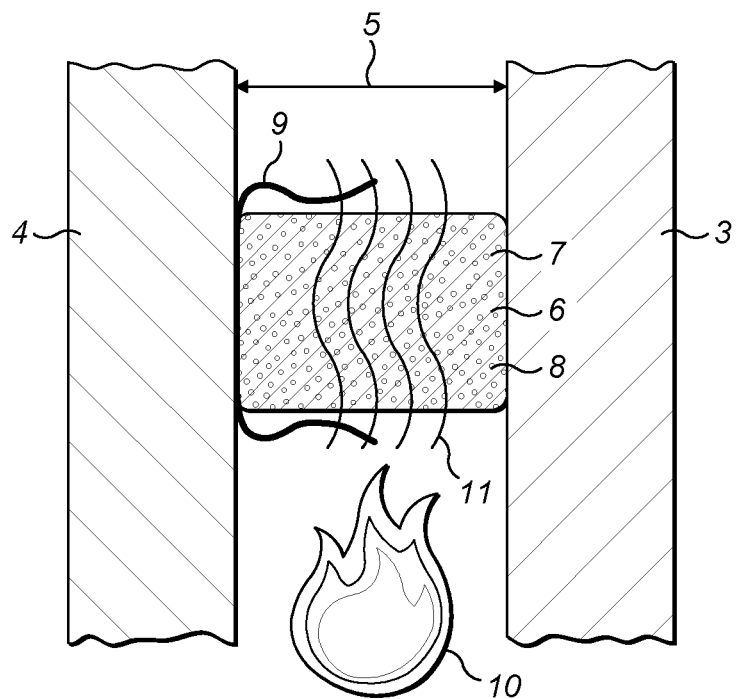

FIG. 4c shows hot gases 11 resulting from a fire 10, which have melted the restraint 9. Due to the absence of a restraint, the foam 7 has expanded across the air gap 5. The foam 7, being porous and polymeric, cannot in itself prevent the spread of hot gases or flames. However, as illustrated in FIG. 4c, the porous nature of the foam and its expanded state allows the hot gases 11 to contact the intumescent graphite 8 in a short space of time. This action means that intumescence can occur very quickly.

Figure 4D:
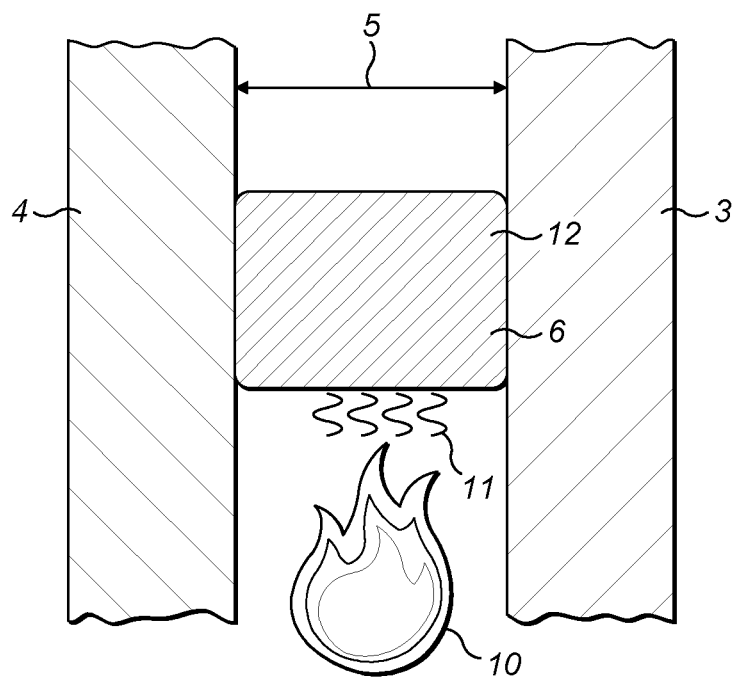

Once the graphite 8 has intumesced, the ventilation cavity 5 is blocked to the passage of hot gases as shown in FIG. 4d and the spread of fire 10 across the façade 1 is halted. The intumescent graphite 8 forms a char 12 that is impermeable to the hot gases 11.

EXAMPLE

A comparative test was carried out to illustrate the benefits of the fire-stopping product of the invention compared to an existing commercially available fire-stopping product. The test carried out simulates a fire-stopping product in a fire situation. A (0.5 m×0.5 m×0.5 m) furnace was used with heating to the ISO834 cellulosic fire curve.

Figure 3:
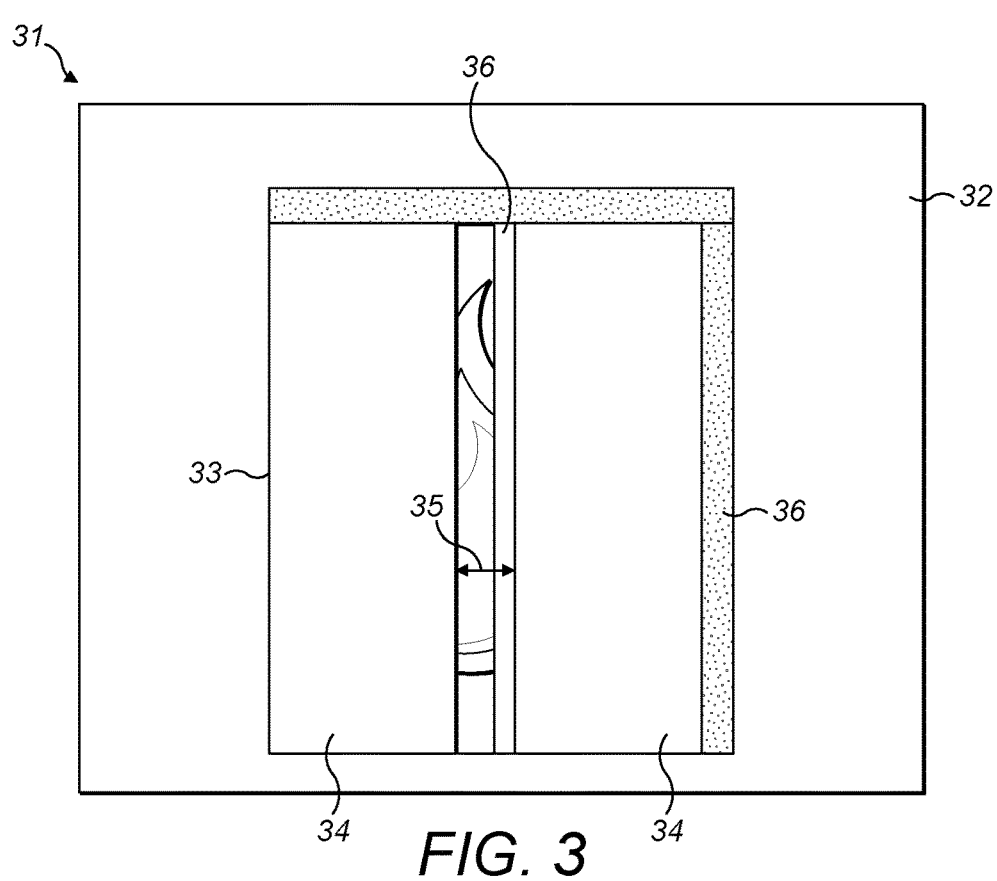
FIG. 3 shows the test setup for the example.

The general arrangement of the test conditions is described below with reference to FIG. 3. The furnace is essentially a cube with two removable walls, two fixed vertical walls, a bottom with gas burners and a top with a flue. The removable walls have apertures provided to allow the testing of joints and penetrations. FIG. 3 shows a plan view of one of these removable walls set up to test the fire-stopping product of the invention.

The furnace (31) was provided with two vertical walls (32) each being 100 mm thick, each having an aperture (33) for test pieces of 300 mm height and 210 mm width, extending the full 100 mm of thickness.

To simulate the working conditions of a fire-stopping product, into each aperture (33) were placed two aerated concrete blocks (34) of 300 mm height by 90 mm width by 100 mm thickness, arranged so as to provide a slot (35) of 25 mm width, 300 mm height and 100 mm thickness extending from the inside of the furnace (hot zone) to the outside (ambient temperature.) The remaining spaces between the blocks and the furnace apertures were sealed with mineral wool (36).

These slots (35) were partially filled with fire-stopping products (36) which would then expand, intumesce and close the slots (35) during the fire test.

One slot was provided with a commercial product, Firetherm Rainbar 60-25, which comprises a thermoplastic polymer carrier compounded with intumescent graphite. This product as supplied has a cross-section of 60 mm×4 mm and was cut to 300 mm length and arranged in the slot so as to leave an opening of 21 mm thickness between the hot zone and the outside.

The second wall was the same, but with the commercial product replaced by a fire-stopping material according to the invention. This was a block of material having dimensions 300 mm×100 mm×25 mm, compressed to 10 mm and held in compression by means of a meltable (low density polyethylene) plastic wrap with a softening point around 105° C.

Although the starting thickness of the product according to the invention was greater, using a greater thickness of the conventional fire-stopping material would not make it faster as it would further increase the thermal mass and hence the increase the heat-up time to trigger intumescence.

The time for the fire-stopping products to expand, intumesce and fill the gap is shown below:

| | |
|---|---|
| Commercially available fire-stopping product Rainbar 60-25 | 7 minutes |
| Fire-stopping material according to the invention | 1-2 minutes |

The fire-stopping product of the invention demonstrates a clear improvement over existing products, by decreasing the amount of time taken to block a cavity through which fire would otherwise quickly spread.

The invention claimed is:

1. A fire-stopping product comprising a resilient, porous material at least partially impregnated with an intumescent agent,
   wherein the resilient, porous material is held in compression by a releasable restraint,
   wherein the restraint yields on exposure to heat or flames.

2. A fire-stopping product according to claim 1, wherein the resilient, porous material is further at least partially impregnated with a binder.

3. A fire-stopping product according to claim 2, wherein the binder comprises one or more of an acrylic binder, polyvinyl acetate, polyvinyl acrylate, polyvinyl chloride mixed polymerisates, polychloroprenes and carbonisers, such as for example phenolic resins, melamine resins, polyimides or polyacrylonitrile.

4. A fire-stopping product according to claim 2, wherein the binder comprises an acrylic binder.

5. A fire-stopping product according to claim 1, wherein the intumescent agent includes at least one of: graphite, polyphosphate, melamine, pentaerythritol, titanium dioxide and exfoliated vermiculite.

6. A fire-stopping product according to claim 1, wherein the intumescent agent comprises graphite.

7. A fire-stopping product according to claim 1, wherein the intumescent agent comprises graphite and ammonium polyphosphate.

8. A fire-stopping product according to claim 1, wherein the resilient, porous material has a porosity of 10-100 pores per lineal inch (ppi).

9. A fire-stopping product according to claim 1, wherein the resilient, porous material comprises an open-cell foam or a non-woven material.

10. A fire-stopping product according to claim 1, wherein the resilient, porous material comprises a polyurethane (PU) open-cell foam.

11. A fire-stopping product according to claim 1, wherein the resilient, porous material comprises a non-woven material comprising at least one of polymeric fibres, metallic fibres and inorganic fibres.

12. A fire-stopping product according to claim 1, wherein the weight ratio of the resilient, porous material to the combined weight of the intumescent agent, and, if a binder is present, the binder is from 1:1 to 1:8 by dry weight.

13. A fire-stopping product according to claim 1, wherein the product is in the form of a tape.

14. A fire-stopping product according to claim 1, wherein the product has the shape of a plate.

15. A fire-stopping product according to claim 1, wherein the restraint is in the form of a tape, thread, film, extruded tube, net, or shrink-wrapped tubing.

16. A fire-stopping product according to claim 1, wherein the restraint is polymeric.

17. A fire-stopping product according to claim 1, wherein the restraint comprises one or more polymers selected from polyethylene, polymethylmethacrylate, polystyrene, polyvinylchloride, polypropylene and acrylonitrile butadiene styrene.

18. A fire-stopping product according to claim 1, wherein the restraint comprises low-density polyethylene (LDPE).

19. A fire-stopping product according to claim 1, wherein the restraint comprises a thread.

20. A fire-stopping product according to claim 1, wherein the restraint is a meltable solid impregnated into the resilient, porous material.

21. A fire-stopping product according to claim 20, wherein the meltable solid is a wax.

22. A fire-stopping product according to claim 1, wherein the restraint yields by undergoing a physical and/or chemical transformation.

23. A fire-stopping product according to claim 1, wherein the restraint yields by burning, melting, softening or undergoing a glass transition.

24. A fire-stopping product according to claim 1, wherein the intumescent agent has an intumescence temperature and wherein the restraint yields at a temperature below the intumescence temperature.

25. An insulated building façade comprising an external wall and a cladding layer substantially parallel to the external wall, wherein the external wall and the cladding layer define an air gap there between,
   wherein a fire-stopping product is disposed within the air gap and is attached to a part of a face of the cladding layer or a face of the external wall and is expandable to fill the distance between the cladding and the thermal insulation when contacted with the heat of a fire,
   wherein the fire-stopping product comprises a resilient, porous material at least partially impregnated with an intumescent agent,
   wherein the resilient, porous material is held in compression by a releasable restraint, and wherein the restraint is released by melting or softening on exposure to hot gases from a fire.

26. An insulated building façade according to claim 25, wherein a face of the external wall adjacent to the air gap is provided with a layer of thermal insulation, such that the air gap is defined by the layer of thermal insulation and the cladding layer.

27. An insulated building façade according to claim 25, wherein the fire-stopping product is in the form of a tape oriented in a substantially horizontal position relative to the façade.

28. A method of manufacturing a fire-stopping material comprising the steps:
   a. providing a resilient, porous material;
   b. providing a solution of an intumescent agent;
   c. impregnating the resilient, porous material with the solution;
   d. drying the solution, thereby removing liquid;
   e. compressing the resilient, porous material;
   f. constraining the resilient, porous material in its compressed state with a restraint.

29. A method according to claim 28, wherein the step of constraining the resilient, porous material comprising impregnating the compressed resilient, porous material with a meltable solid in its liquid state and then allowing the liquid to cool and solidify, thereby maintaining the resilient, porous material in its compressed state.

30. A method according to claim 28, wherein the step of constraining the resilient, porous material comprises affixing a polymeric mechanical restraint around at least a portion of the outside of the resilient, porous material.

* * * * *